March 12, 1957 F. W. ROHE 2,784,758
WELD NUT WITH WELDING FLANGE AND SPACER SHOULDER
Filed July 28, 1955
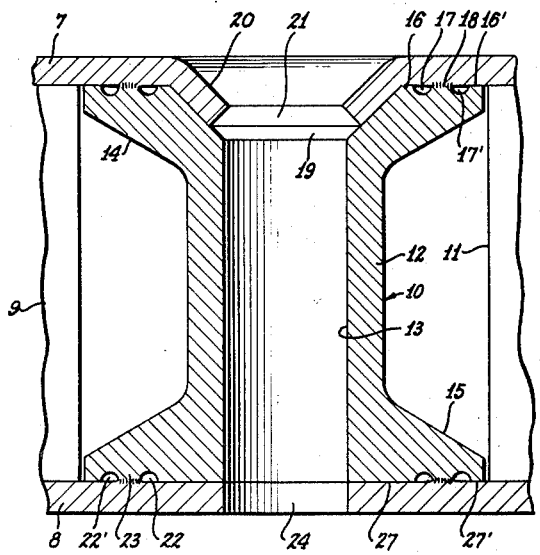
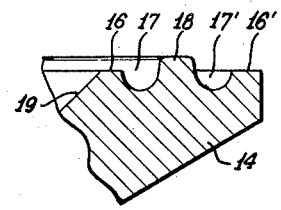
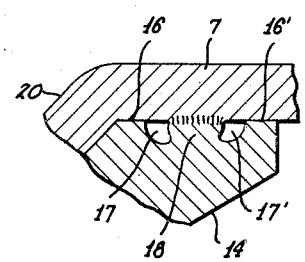
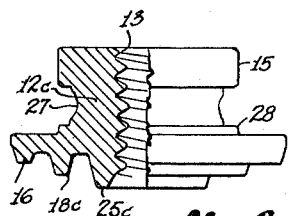
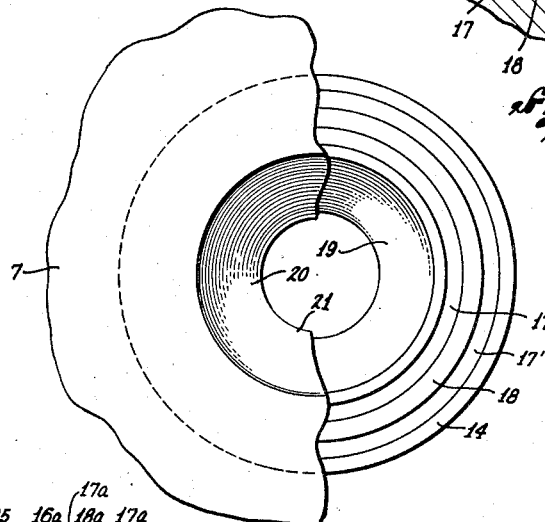
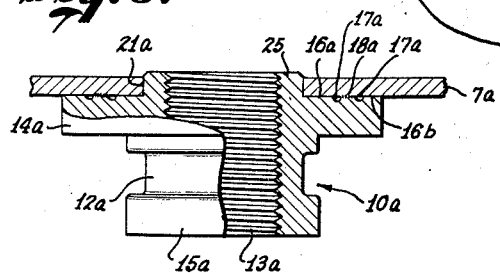
FREDERICK W. ROHE,
INVENTOR.
BY Lynn H Latta
ATTORNEY.

United States Patent Office 2,784,758
Patented Mar. 12, 1957

2,784,758
WELD NUT WITH WELDING FLANGE AND SPACER SHOULDER

Frederick W. Rohe, Fullerton, Calif.

Application July 28, 1955, Serial No. 524,932

1 Claim. (Cl. 151—41.7)

This invention relates to fittings of the type including nuts, grommets, inserts, spacers etc., adapted for attachment to a panel or wall structure and designed to function in connection with the fastening of other parts to such wall structure. In one embodiment, the invention may be embodied in a spacer sleeve or grommet secured between the skin sheets of a sandwich type wall structure and providing a sleeve through which a fastener such as a bolt or rivet may be inserted, with the spacer taking the compression load developed in tightening the fastener; and in another embodiment the invention may be utilized in a flange nut, adapted to be attached to a metal sheet or plate and having an internally threaded bore for registry with an opening in such sheet or plate, whereby a bolt or screw may be attached thereto.

The general object of the invention is to provide such a fitting of metal, particularly adapted for anchorage to a metal sheet or plate by welding. More specifically, the invention contemplates a fitting having at one or both ends a head or flange which is particularly adapted to be readily welded to the metal sheet or plate around the periphery of an opening therein, and which has means for locating it with reference to such opening so as to obtain exact registration and also to strengthen the joint between the fitting and the metal sheet in the final structure.

A further object is to provide a fitting having a welding flange particularly adapted for welding to a metal sheet, and having means providing an end face for abutment with the sheet so as to accurately position the fitting with its axis normal to the plane of the sheet in the final structure.

Other objects will become apparent in the ensuing specifications and appended drawing in which:

Fig. 1 is an enlarged axial sectional view of a fitting embodying the invention, embodied as a spacer in a sandwich type wall structure including spaced parallel metal skin sheets to which the flanges of the respective ends of the fitting are secured by welding;

Fig. 2 is an enlarged fragmentary sectional view of one of the welding flanges;

Fig. 3 is a plan view of the installed fitting with a portion of the skin sheet broken away;

Fig. 4 is an enlarged fragmentary sectional view of the weld between the fitting flange and the skin sheet;

Fig. 5 is a view, partially in section and partially in side elevation, of a flange nut embodying the invention; and Fig. 6 is a partially sectional side view of a modified form of the nut.

Referring now to the drawings in detail, I have shown in Figs. 1 to 4 inclusive, as an example of one form in which the invention may be embodied, a sandwich type wall structure embodying skin sheets 7 and 8, of light weight, an open work core structure 9 which may be of a cellular type; and a spacer fitting 10 enclosed within an opening 11 in the cellular structure 9 and bridging between the skin sheets 7 and 8.

Spacer fitting 10 includes a tubular body sleeve 12, preferably cylindrical, with a cylindrical bore 13 through which a fastener element such as a bolt or rivet may be passed. Fitting 10 also includes end flanges 14 and 15, having respective shoulders 16, 16' and 17, 17' defining respective end faces, normal to the axis of sleeve 12, for locating abutment against the inner faces of skin sheets 7 and 8 respectively. Shoulders 16, 16' are relatively narrow, annular, concentric with the axis of sleeve 12, and are spaced by annular face grooves 17, 17'. A welding bead 18, likewise annular and concentric with the axis of sleeve 12, is disposed between the grooves 17, 17'. Inwardly of shoulder 16, flange 14 has a counterbore 19 which flares outwardly from bore 13 to meet shoulder 16. Counterbore 19 is adapted for mating reception of the outer wall of a dimple 20 in skin sheet 7, dimple 20 having an aperture 21 for alignment with bore 13. Flange 15 has a pair of face grooves 22, 22' located between shoulders 17, 17', and separated by a welding bead 23. Sheet 8 has an aperture 24 to register with bore 13.

Welding beads 18 and 23 project beyond the planes of the end faces defined by shoulders 16, 16', 27, 27' respectively, whereas grooves 17, 17', 22, 22' extend below these end face planes. Consequently, upon projection welding of the beads 18, 23 to the inner faces of skin sheets 7, 8 respectively, the excess metal in beads 18 and 23, softened by the welding operation, is extruded into the grooves 17, 17', 22, 22', as best illustrated in Figure 4.

In the assembly of the sandwich wall structure of Fig. 1, the skin sheets 7 and 8 are first punched to provide the openings 21 and 24; the sheet 7 is then dimpled around openings 21 to provide dimples 20; the skin sheets are then assembled to the core structure 9, with the spacers 10 being simultaneously assembled and located by the engagement of dimples 20 in counterbores 19; and means such as locating pins are projected up through the openings 24 into the bores 13. Using suitable welding jaws, one of which may include a pilot passed through opening 24 into bore 13, after removal of a locating pin, the skin sheets are then projection welded to the spacers, one at a time, by closing the welding jaws, and applying pressure to the skin sheets to force them against the welding beads 18 and 23 respectively. Initial contact will be restricted to the projection beads 18 and 23, and the welding temperature will therefore be concentrated at the end faces of the welding beads, as the welding current is transmitted through the assembled skin sheets and spacer element. The welding beads 18 and 23, and the areas of the skin sheet directly engaged thereby, will be softened to the point of welding union between the two, and further pressure will then cause the skin sheets to advance into contact with the end face shoulders 16, 16', 17, 17' of the flanges 14 and 15 respectively. By proper timing, the welding operation can be terminated at the instant of full engagement of the skin sheets with these end face shoulders, so that the shoulders will remain unsoftened and will locate against the inner faces of the skin sheets to provide accurate spacing between the sheets and accurate positioning of the spacer element with its axis normal to the plane of the skin sheets. In the final structure, the welding beads 18 and 23 are united to the skin sheets while the shoulders 16, 16', 17, 17' are in contact bearing engagement with the inner faces of the skin sheets.

Referring now to Fig. 5, there is shown therein a modified form of the invention as embodied in a self locking flange nut 10a comprising a tubular body 12a, a reinforcing flange 15a at one end, a welding flange 14a at its other end, and a pilot 25 constituting a continuation of tubular body 12a on the opposite side of flange 14a, from which it projects so as to be piloted in an aperture 21a in a panel sheet 7a to which the nut is to be mounted. Flange 14a embodies a welding bead 18a, annular and concentric with the axis of body 12a; a pair of annular face grooves 17a on respective sides of bead 18a and concentric therewith; and a pair of end face shoulders 16a, 16b respectively disposed radially inwardly and outwardly of the grooves 17a and cooperatively defining a flat end face for locating against the panel sheet 7a. Nut 10a has an internally threaded bore 13a for the reception of a screw or bolt. Flange 14a is attached to sheet 7a in the same manner as the attachment of flange 14 to sheet 7 in Fig. 1, the pilot 25 locating the nut during the preliminary assembly and welding operation.

Fig. 6 illustrates the further modified form of the invention wherein a nut body 12c having an internal thread 13 and having at one end a pilot flange 25d receivable in an aperture (as in Fig. 5) in a panel sheet 7a to which the nut is to be mounted. A mounting flange (corresponding to the flange 14a in Fig. 5) projects radially from the body 12c adjacent the pilot flange 25c and has adjacent its periphery an annular shoulder flange 16. A welding flange 18c is disposed intermediately between the pilot 25c and shoulder flange 16, with the pilot 25c projecting beyond the welding flange 18c and the welding flange projecting beyond the shoulder flange 16 in stepped arrangement. On either side of the welding flange 18c are annular grooves (corresponding to the grooves 17a in Fig. 5), for receiving excess weld metal. The shoulder flange 16 is of substantially greater face area than the welding flange 18c and is adapted to engage the sheet metal panel without deformation during welding and therefore fixes the position of the nut during welding. The pilot 25c projects only slightly beyond the plane of welding flange 18c, which in turn projects beyond the plane of mounting flange 16c. To illustrate the extent of projection of pilot 25c beyond welding flange 18c, in a nut having an overall diameter of one half inch for the flange 14c, the pilot 25c may project approximately .020 inch.

Fig. 6 also illustrates in somewhat exaggerated degree, the self-locking construction which is also utilized in the nut of Fig. 5 but is not illustrated in Fig. 5. This self-locking feature comprises an annular depression 27 in reduced neck 12c, in which the central portion of neck 12c, substantially midway between head 15 and shoulder 28, is permanently deformed toward the axis of the nut throughout the full circumference thereof. This is accomplished by rolling the neck 12a between rollers which shrink its diameter slightly, thereby shrinking the pitch diameter of one or two turns of the thread 13c of the nut, the total shrinkage, in the nut of the dimensions mentioned above being no more than several .010 of an inch (e. g. .0001 to .0003). The inward deformation of the locking threads is sufficiently slight so that when the nut is threaded onto and off of a bolt, the reduced neck portion 12a is capable of "breathing" within the elastic limits of the metal (steel or a metal having a comparable modulus of elasticity) of which it is fabricated. Thus the nut may be applied to and removed from a bolt countless numbers of times without deteriorating the locking function thereof.

I am aware of course that many efforts have been made in the past to provide a self locking nut wherein a portion of a nut thread is deformed. However so far as I am aware, in all such cases the effort has been to deform the thread through only a portion of the circumference of the nut such as by ovalating, and I have found that such expedients do not prove satisfactory in service, especially since they place an uneven gripping pressure against the threads of the bolt, in which pressure is restricted to one or two areas of limited circumferential extent. In contrast to this, my locking bolt wherein the area of deformation of the threads is quite restricted along the axis of the nut but extends throughout the entire circumference of the nut, has proven very successful in service, particularly with respect to durability and avoidance of rapid wear when the nut is threaded onto and unthreaded from the bolt.

The invention provides a fitting which can be rapidly attached to a panel sheet for high degree of accuracy in locating the same with reference to an aperture in the sheet and in locating the axis of the fitting normal to the plane of the sheet.

I claim:

A nut for welding attachment to a sheet metal panel having an aperture therein, comprising a nut body having an internal thread and having at one end a pilot flange receivable in said aperture; a mounting flange projecting radially from said body adjacent said pilot flange, said mounting flange having, adjacent its periphery, an annular shoulder flange, and having an annular welding flange disposed intermediate said shoulder flange and said pilot flange, said shoulder flange and welding flange being concentric with and projecting axially in the same direction as said pilot, with the pilot projecting beyond the welding flange and the welding flange projecting beyond the shoulder flange in stepped arrangement, said mounting flange having annular grooves defined on respective sides of said welding flange, for receiving excess weld metal, one of said annular grooves being defined directly between said shoulder flange and said welding flange and the other of said grooves being defined directly between the welding flange and said pilot, said shoulder flange being of greater face area than said welding flange and adapted to engage said sheet metal panel without substantial deformation during welding so as to position said nut for height with reference to said panel; and a head portion spaced axially from said mounting flange and a neck portion of reduced external diameter joining said head portion to said mounting flange, said neck portion having an annular intermediate section thereof, including the corresponding portion of said internal thread, slightly displaced radially inwardly throughout the circumference thereof, to an extent such that said corresponding portion of the thread has a diameter smaller than the diameter of the remainder of the thread by an amount sufficient to effect a binding action thereof upon the thread of a bolt threaded into the nut and sufficiently small so that said inwardly displaced neck portion will be expanded by the action of forcing the bolt therethrough, with an expansion that is within the elastic limit of said neck portion, whereby said expansion will not result in any permanent increase in diameter of said reduced thread portion.

References Cited in the file of this patent

UNITED STATES PATENTS

| | | |
|---|---|---|
| 2,372,772 | Ellis et al. | Apr. 3, 1945 |
| 2,585,557 | Kreimendahl | Feb. 12, 1952 |

FOREIGN PATENTS

| | | |
|---|---|---|
| 647,312 | Great Britain | Dec. 13, 1950 |